Patented Nov. 28, 1933

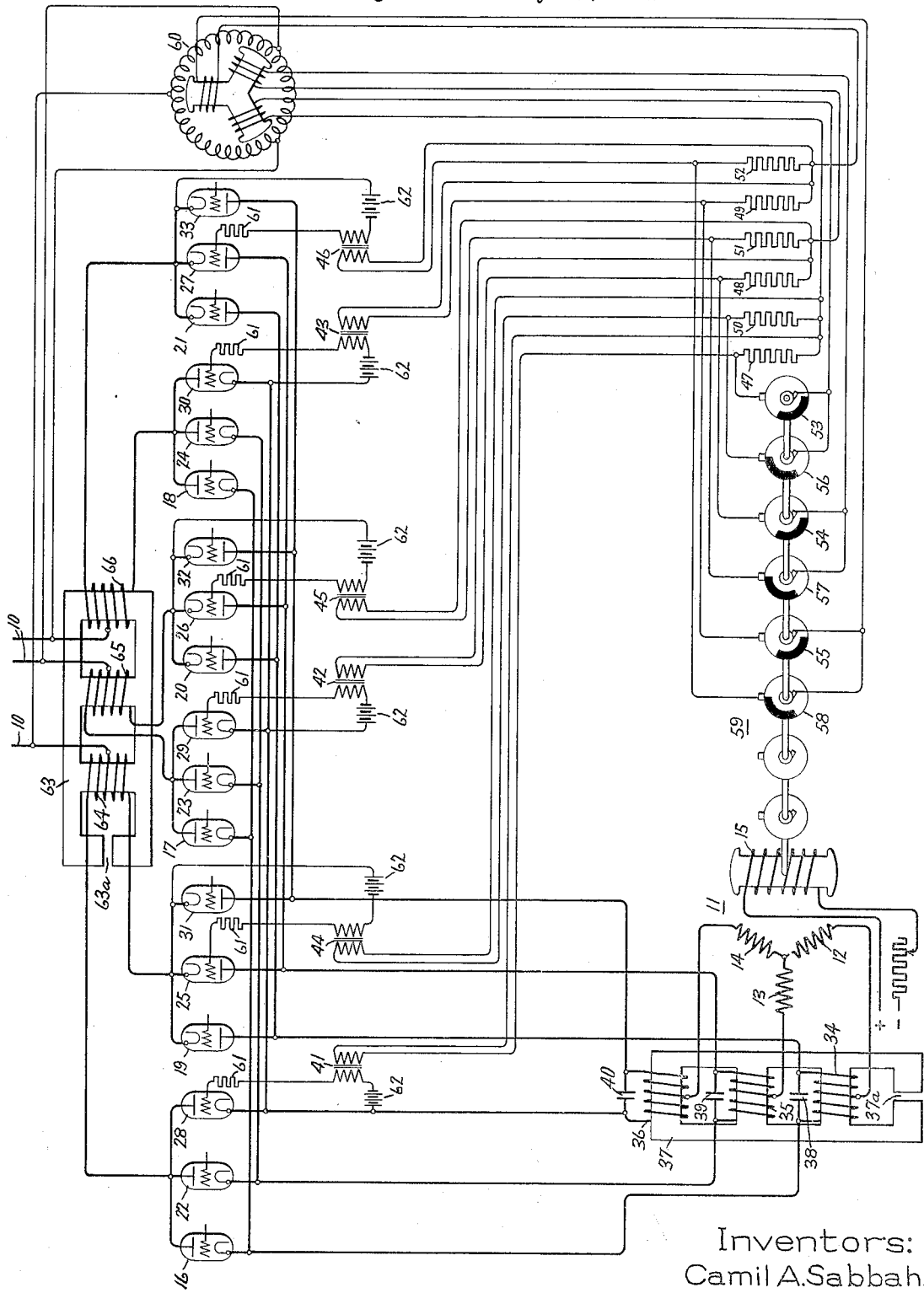

1,937,361

UNITED STATES PATENT OFFICE 1,937,361

ELECTRIC VALVE CONVERTING SYSTEM

Camil A. Sabbah and Marvin M. Morack, Schenectady, N. Y., assignors to General Electric Company, a corporation of New York Application May 27, 1932, Serial No. 614,128
Renewed August 18, 1933

5 Claims. (Cl. 172—281)

Our invention relates to electric valve converting systems and more particularly to such systems adapted to transmit energy between independent alternating current circuits of the same or different frequencies.

Heretofore, there have been proposed numerous arrangements including electric valves for transmitting energy between alternating current circuits of the same or different frequencies. Certain of these arrangements of the prior art have been subject to the disadvantage that the failure of an electric valve would tend to cause a short circuit on one or both of the alternating current circuits. Certain other of the arrangements of the prior art have overcome the above disadvantage at the expense of one or more insulation transformers or reactors for separating certain portions of the circuits in which short circuit currents might occur. The arrangements of the prior art have, in general, been subject to the additional disadvantage that each of the several electric valves conducts current for a fraction of each cycle equal to the product of the reciprocal of the number of phases of the supply and load circuits.

It is an object of our invention to provide an improved electric valve converting system which will overcome the above mentioned disadvantages of the arrangements of the prior art and which will be simple and reliable in operation.

Another object of our invention is to provide an improved electric valve converting system for transmitting energy between alternating current circuits of the same or different frequencies in which short-circuit currents occasioned by the failure of an electric valve may be substantially eliminated.

It is a further object of our invention to provide an improved electric valve converting system for transmitting energy between independent alternating current circuits of the same or different frequencies in which a period of conductivity of each of the several electric valves may be substantially extended.

In accordance with one embodiment of our invention a polyphase alternating-current supply circuit is connected to supply a variable frequency alternating current circuit, such for example, as a variable frequency alternating current motor, through an electric valve frequency changer. The frequency changer comprises two groups of oppositely connected electric valves interconnecting each phase of the load circuit with the several terminals of the supply circuit. Interposed in the connections between the groups of each pair is an inductive winding provided with an electrical midpoint connected to one phase of the load circuit. The several inductive windings are mounted on a multi-legged magnetic core structure to form a polyphase reactance device so connected in the system that any short-circuit current between the several lines of the supply circuit will be opposed by the full magnetizing impedance of the reactance device and thus limited to a negligible value. In some cases, also, it may be desirable to include a similarly connected reactance device in the connections between the several groups of electric valves and the supply circuit.

For a better understanding of our invention, together with other and further objects thereof, reference is had to the following description taken in connection with the accompanying drawing, and its scope will be pointed out in the appended claims. The single figure of the accompanying drawing illustrates an arrangement embodying our invention for transmitting energy from a three-phase alternating-current supply circuit to a three-phase synchronous dynamo-electric machine adapted to operate at a variable frequency.

Referring now to the drawing, there is illustrated an electric valve converting system embodying our invention for transmitting energy from a three-phase alternating-current supply circuit 10 to a three-phase alternating-current load circuit, which by way of example, is illustrated as a three-phase synchronous dynamo-electric machine 11 adapted to operate at a variable frequency. The synchronous machine 11 comprises phase windings 12, 13 and 14 and a rotary field or exciting winding 15. The phase winding 12 is connected to receive energy from the several lines of the supply circuit 10 through a group of electric valves 16, 17 and 18 and to return current to the circuit 10 through a group of valves 19, 20 and 21 connected oppositely to the first group of valves. Interposed between the groups 16—17—18 and 19—20—21 is an inductive winding 34 provided with an electrical midpoint connected to the phase winding 12. Similarly the phase winding 13 is connected to the circuit 10 through the inductive winding 35 and the groups of electric valves 22—23—24 and 25—26—27 and the phase windings 14 through the inductive winding 36 and the groups of valves 28—29—30 and 31—32—33. The inductive windings 34—35—36 are mounted on three legs of a single multi-legged magnetic core member 37 and comprise a polyphase reactance device. The magnetic core member 37 is preferably provided with a fourth leg having an air gap 37a which is effective to smooth the voltage ripples of the supply circuit from the armature windings of the motor 11. The electric valves 16—33, inclusive, are each provided with an anode, a cathode, and a control grid and may be of any of the several types well known in the art, although we prefer to use valves of the vapor electric discharge type. In certain instances it may be desirable to connect the capacitors 38—39—40 in parallel to the inductive windings 34—35—36, respectively, to assist in the commutation of current between the several groups of valves connected with the inductive windings, especially in cases where the apparatus is supplying an inductive load. The exciting winding 15 of the synchronous machine 11 may be excited from any suitable source of unidirectional current as illustrated.

In order to control the conductivities of the several electric valves that supply current successively to the several phase windings of the synchronous machine 11, the grids of the several groups of electric valves are adapted to be selectively excited, through a distributor 59, with an alternating potential of the frequency of the supply circuit 10. For example, the grids of the group of valves 28—29—30 are energized through their respective grid transformers 41—42—43 with the potentials across resistors 47—48—49, which in turn are energized with an alternating potential of substantially the same phase as that line of the supply circuit 10 to which their associated electric valves are connected, through the segments 53, 54, and 55, respectively, of the distributor 59, mechanically driven from the synchronous machine 11. Similarly, the grids of the group of valves 25—26—27 connected to the phase winding 13 are energized through their respective grid transformers 44—45—46 with the potentials across resistors 50, 51, 52 which are similarly energized through the sections 56, 57 and 58 of the distributor 59. If desired, some phase-shifting arrangement, such for example, as a rotary phase-shifting transformer 60 may be interposed between the supply circuit 10 and the several resistors 47—52, inclusive, which furnish the source of grid excitation, to control the energy supplied to the machine 11. The grid circuits of each of the groups of valves 28—29—30 and 25—26—27 may include current limiting resistors 61 and negative bias batteries 62.

For the sake of simplicity there has been shown only the grid circuits for those groups of valves adapted to form one complete current path from the alternating-current circuit 10 through the armature winding of the machine 11. However, it will be apparent to those skilled in the art that the grids of the several other electric valves will be excited in a manner similar to that just described. The several sections of the distributor 59 should be so chosen that the grids of the several groups of electric valves are excited to render them conductive in accordance with the following table, in which the time is given in electrical degrees referred to the load circuit:

| 0-60    |          | 22-23-24 | 28-29-30 | 19-20-21 | 25-26-27 |          |
|---------|----------|----------|----------|----------|----------|----------|
| 60-120  | 16-17-18 |          | 28-29-30 | 19-20-21 | 25-26-27 |          |
| 120-180 | 16-17-18 |          | 28-29-30 |          | 25-26-27 | 31-32-33 |
| 180-240 | 16-17-18 | 22-23-24 |          |          | 25-26-27 | 31-32-33 |
| 240-300 | 16-17-18 | 22-23-24 |          | 19-20-21 |          | 31-32-33 |
| 300-360 |          | 22-23-24 | 28-29-30 | 19-20-21 |          | 31-32-33 |

However, the features of energizing a synchronous dynamo-electric machine as described above and the distributor arrangement for controlling the grids of the several electric valves are broadly claimed in a copending application of C. H. Willis, Serial No. 598,518, filed March 12, 1932, and in the copending applications of E. F. W. Alexanderson, Serial No. 638,361, filed May 11, 1923, and Serial No. 598,380, filed March 12, 1932, all assigned to the same assignee as the present application, while the use of a polyphase reactance device as described above to extend the period of conductivity of the several electric valves in a valve-converting apparatus is broadly claimed in the copending application of C. A. Sabbah, Serial No. 430,735, filed February 24, 1930, also assigned to the same assignee as the present application.

In order to provide still further protection against short-circuit currents and to still further extend the periods of conductivity of the several electric valves, an additional reactance device comprising a multi-legged magnetic core member 63 and inductive windings 64, 65 and 66 may be interposed between the alternating-current circuit 10 and the several electric valves in a manner similar to that of the reactance device described above. The core member 63 may also be provided with a fourth leg having an air gap 63a. In case this reactance device is not desired, it will be understood that each of the lines of the circuit 10 will be connected directly to the two groups of valves to which it is connected through the several windings 64, 65 and 66 as illustrated.

From the above description, it will be noted that each of the phase windings 12—13—14 is interconnected with each of the lines of the supply circuit 10 through two electric valves connected to transmit current in opposite directions and separate portions of the inductive windings of the two reactance devices. As explained in more detail in the afore-mentioned copending application of C. A. Sabbah, the polyphase reactance devices tend to maintain constant their total magnetomotive forces, that is, the sum of the currents flowing in their several windings as well as the magnetomotive forces of each leg. This condition of constant magnetomotive forces for all the windings and for each particular winding, it has been found, can be satisfied only when four of the electric valves associated with a reactance device are conductive at a given instant, that is, one valve from each of four of the groups 16—17—18, 19—20—21, etc., are conductive at any given instant. As explained in more detail in the above-mentioned application, one valve of each of the groups is conductive for a period of 240 electrical degrees and non-conductive for 120 electrical degrees. Similarly, the reactance device 63 together with the windings 64—65—66 insures that one valve from each of four of the groups 16—22—28, 19—25—31, etc., are conductive at any given instant. Hence, each of the groups of valves when considering the groupings with respect to one reactance device, is conductive for two-thirds of a cycle, while each of the valves within a group or each of the groups of valves, referred to the other reactance device, is similarly conductive for two-thirds of a cycle, so that each electric valve is conductive for 4/9 of a cycle rather than 1/9 of a cycle as in similar arrangements of the prior art.

The specific circuits by means of which current is transferred from the alternating current circuit 10 to the dynamo-electric machine 11 may now be considered. With the distributor 59 in the position illustrated, the groups of valves 28—29—30 and 25—26—27 are excited from their respective grid transformers through the sections 53—58, inclusive, of the distributor 59. These two groups of valves which, it is seen, are oppositely connected with respect to the supply circuit 10, comprise a three-phase full-wave rectifier of the type disclosed in the above-mentioned application of C. A. Sabbah, in which the direct-current load circuit comprises the left-hand portion of inductive winding 36, armature windings 14 and 13 of the synchronous machine 11 and the right-hand portion of inductive winding 35. At the same instant, the groups of valves 22—23—24 and 19—20—21 comprise another three-phase full-wave rectifier circuit of the same type in which the direct-current circuit comprises the left-hand portion of the inductive winding 35, the phase windings 13 and 12 of the motor 11 and the right-hand portion of the inductive winding 34, although as may be seen from the above table, these two rectifier circuits operate for different but overlapping portions of each cycle of the low-frequency circuit. During a portion of this interval a current path is also completed through the group of valves 28—29—30, the left-hand portion of winding 36, phase windings 14 and 12 of the machine 11, the right-hand portion of inductive winding 34 and the group of valves 19—20—21. The resultant current in the several phase windings of the machine 11 produces a torque upon the rotating member 15 and, as it begins to rotate, it drives the connected distributor 59 with the result that the grid excitation is transferred between the groups of valves in the order given above to transfer the load current between the several phase windings of the machine 11 and to advance the resulant magnetomotive force thereof, thus maintaining a torque upon the rotating member 15.

As stated above, the currents so divide themselves between the several windings of the two reactance devices 37 and 63 as to maintain constant their magnetomotive forces. If a short circuit occurs due to the failure of any electric valve, the short-circuit current flowing in the apparatus tends to change the resultant magnetomotive force of one or both of the reactance devices and is thus opposed by their full magnetizing impedance. In this manner, short-circuit currents are substantially eliminated from the apparatus.

As is well understood by those skilled in the art, the average voltage impressed upon the dynamo-electric machine 11 under starting conditions may be reduced by retarding the grid potentials applied to the several electric valves by means of the rotary phase-shifting transformer 60. This control is also effective to regulate the speed of the dynamo-electric machine under normal operating conditions.

While we have illustrated our invention as applied to an arrangement for transmitting energy from an alternating-current supply circuit to a synchronous dynamo-electric machine, it will be obvious to those skilled in the art that the armature winding of the motor 11 may comprise any suitable polyphase load circuit, such for example, as the primary winding of an output transformer, in which case the grids of the several electric valves may be energized directly from the output circuit or from an auxiliary pilot generator driven to supply a frequency at which it is desired to energize the load circuit. Also, it will be understood that our invention is not limited to the transmission of energy between two three-phase alternating-current circuits, but is equally applicable for energizing any polyphase alternating-current load circuit from an alternating-current supply circuit of any number of phases.

While we have described what we at present consider the preferred embodiment of our invention, it will be obvious to those skilled in the art that various changes and modifications may be made without departing from our invention, and we, therefore, aim in the appended claims to cover all such changes and modifications as fall within the true spirit and scope of our invention.

What we claim as new and desire to secure by Letters Patent of the United States, is:

1. In an electric valve-converting system, the combination of a pair of alternating-current circuits of different frequencies, one of said circuits being a polyphase circuit, a plurality of groups of electric valves interconnecting said circuits, means for successively rendering conductive said groups of valves to transmit energy between said circuits, and a reactance device comprising a magnetic core member having a plurality of parallel magnetic paths and a winding cooperating with each of said magnetic paths, each of said windings interconnecting two groups of said valves and one phase of said polyphase circuit.

2. In an electric valve-converting system, the combination of a pair of alternating-current circuits of different frequencies, one of said circuits being a polyphase circuit, a pair of oppositely connected groups of electric valves for each phase of said polyphase circuit, said valves interconnecting said circuits, means for successively rendering conductive said groups of valves to transmit energy between said circuits, and a reactance device comprising a magnetic core member having a plurality of parallel legs and a winding on each leg, each of said windings interconnecting a phase of said polyphase circuit and its associated pair of groups of valves, and an additional parallel leg on said core member provided with an air gap to substantially eliminate any ripple voltage of either circuit from the other circuit.

3. In an electric valve-converting system, the combination of a pair of alternating-current circuits of different frequencies, one of said circuits being a three-phase circuit, a pair of oppositely connnected groups of electric valves for each phase of said polyphase circuit, said valves interconnecting said circuits, means for successively rendering conductive said groups of valves to transmit energy between said circuits, and a reactance device comprising a three-legged core member and a winding on each leg, each winding interconnecting a pair of groups of valves and being provided with an electrical midpoint connected to one phase of said three-phase circuit.

4. In an electric valve-converting system, the combination of a pair of polyphase alternating-current circuits of different frequencies, a plurality of groups of electric valves interconnecting said circuits, means for successively rendering conductive said groups of valves to transmit energy between said circuits, and a reactance device interposed in the connections between said groups of valves and each of said polyphase circuits, each of said reactance devices comprising a magnetic core member having a plurality of magnetic paths and a winding cooperating with each of said paths, and each of said windings interconnecting two groups of said valves and one phase of its associated polyphase circuit.

5. In an electric valve-converting system, the combination of an alternating-current supply circuit, a polyphase alternating-current load circuit, a plurality of groups of electric valves interconnecting said circuits, means for successively rendering conductive said groups of valves to transmit energy between said circuits, a reactance device comprising a magnetic core member having a plurality of parallel magnetic paths and a winding cooperating with each of said magnetic paths, each of said windings interconnecting two groups of said valves and one phase of said load circuit, and a capacitor connected in parallel to each of said windings to assist in commutating the load current between the groups of valves connected to the several phases of said load circuit.

CAMIL A. SABBAH.
MARVIN M. MORACK.